May 25, 1926.

W. S. HECKMAN

UNIVERSAL PLANER

Filed April 18, 1923

1,586,197

5 Sheets-Sheet 1

Inventor

W. S. Heckman

By Frease and Bond

Attorneys

May 25, 1926.

W. S. HECKMAN

UNIVERSAL PLANER

Filed April 18, 1923     5 Sheets-Sheet 4

1,586,197

Inventor

W. S. Heckman

By Frease and Bond

Attorneys

May 25, 1926.

W. S. HECKMAN

UNIVERSAL PLANER

Filed April 18, 1923  5 Sheets-Sheet 5

1,586,197

Inventor
W. S. Heckman
By Frease and Bond
Attorney

Patented May 25, 1926.

1,586,197

UNITED STATES PATENT OFFICE.

WILLIAM S. HECKMAN, OF MASSILLON, OHIO.

UNIVERSAL PLANER.

Application filed April 18, 1923. Serial No. 632,863.

The invention relates to a machine for cutting or planing "snakes" from the side of a steel ingot; and the object of the improvement is to provide means for moving the ingot horizontally beneath a cutting tool, with independent means for moving the tool transversely of the horizontal movement, for moving the tool perpendicular to the horizontal movement, and for rotating the tool upon its axis, during the operation of the machine, whereby the tool can be made to follow the contour and depth of the "snake" at the will of the operator.

The above and other objects are attained by providing a horizontal table arranged to operate longitudinally to and fro by a reversing motor, upon which table an ingot may be mounted; by mounting a tool head above the table for movement transversely of the table by an independent reversing motor, by mounting a sleeve within the head and rotating the same by an independent reversing motor, by mounting a tool spindle in the sleeve and moving the same vertically by an independent reversing motor, and by controlling the several motors by separate levers located at a convenient point in front of the machine within ready reach of the operator.

An embodiment of the invention thus set forth in general terms is illustrated in the accompanying drawings, in which—

Figure 1:
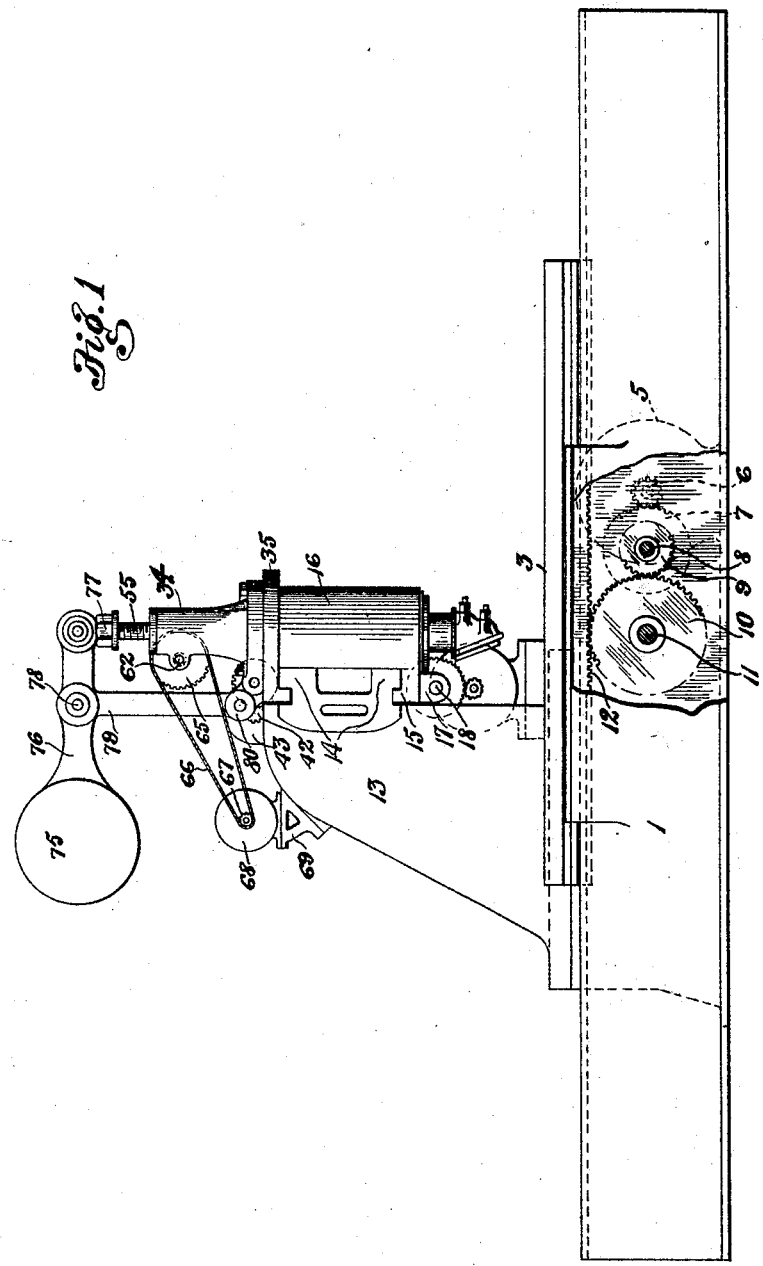
Figure 2:
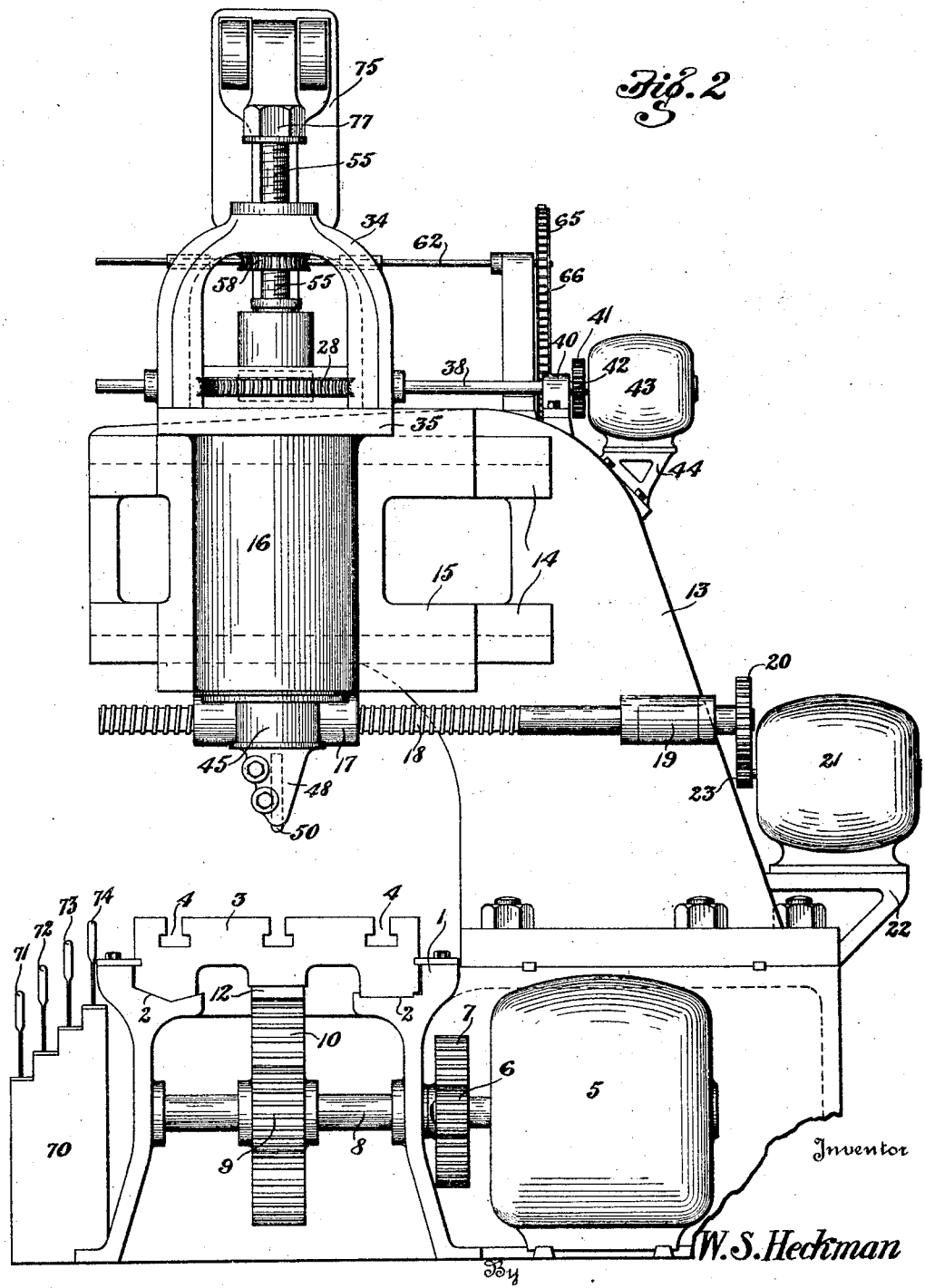
Figure 3:
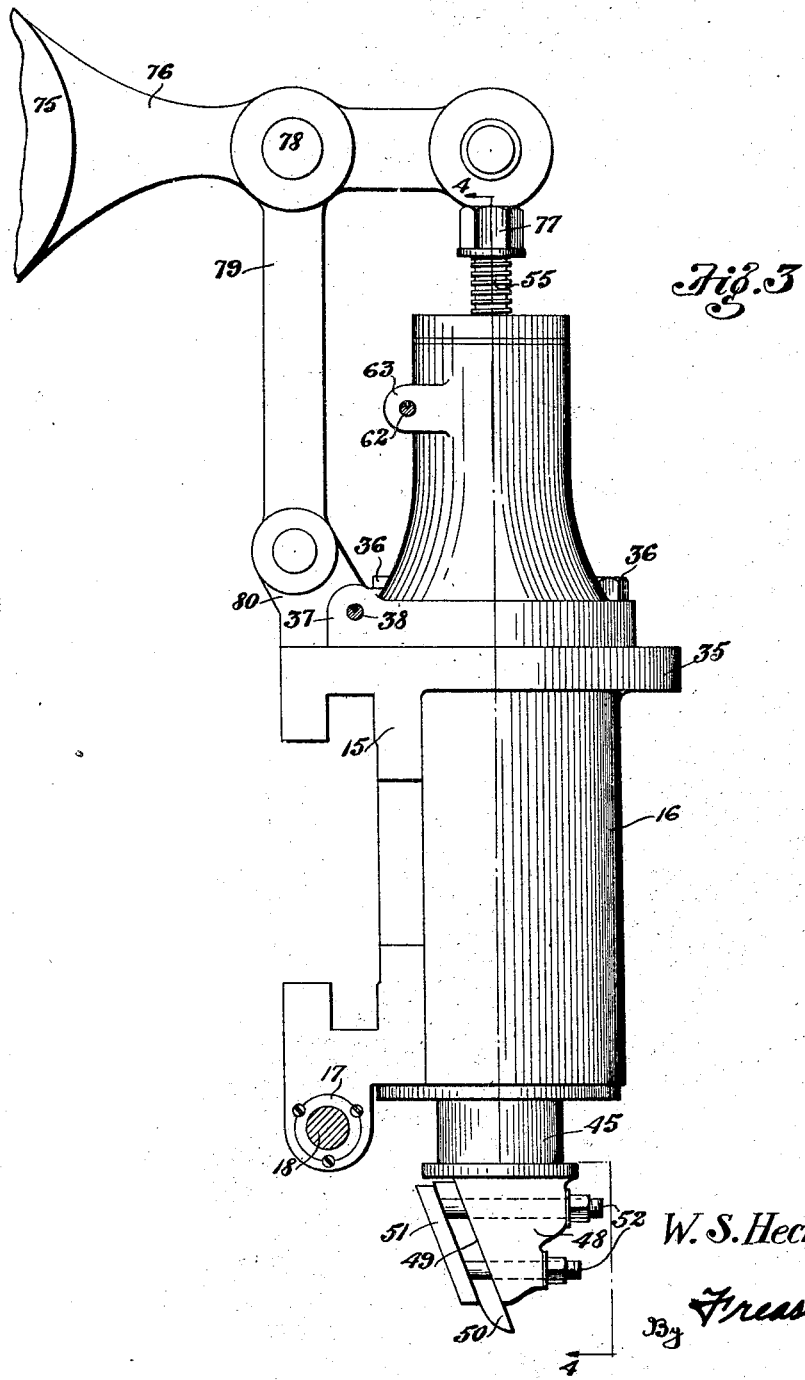
Figure 4:
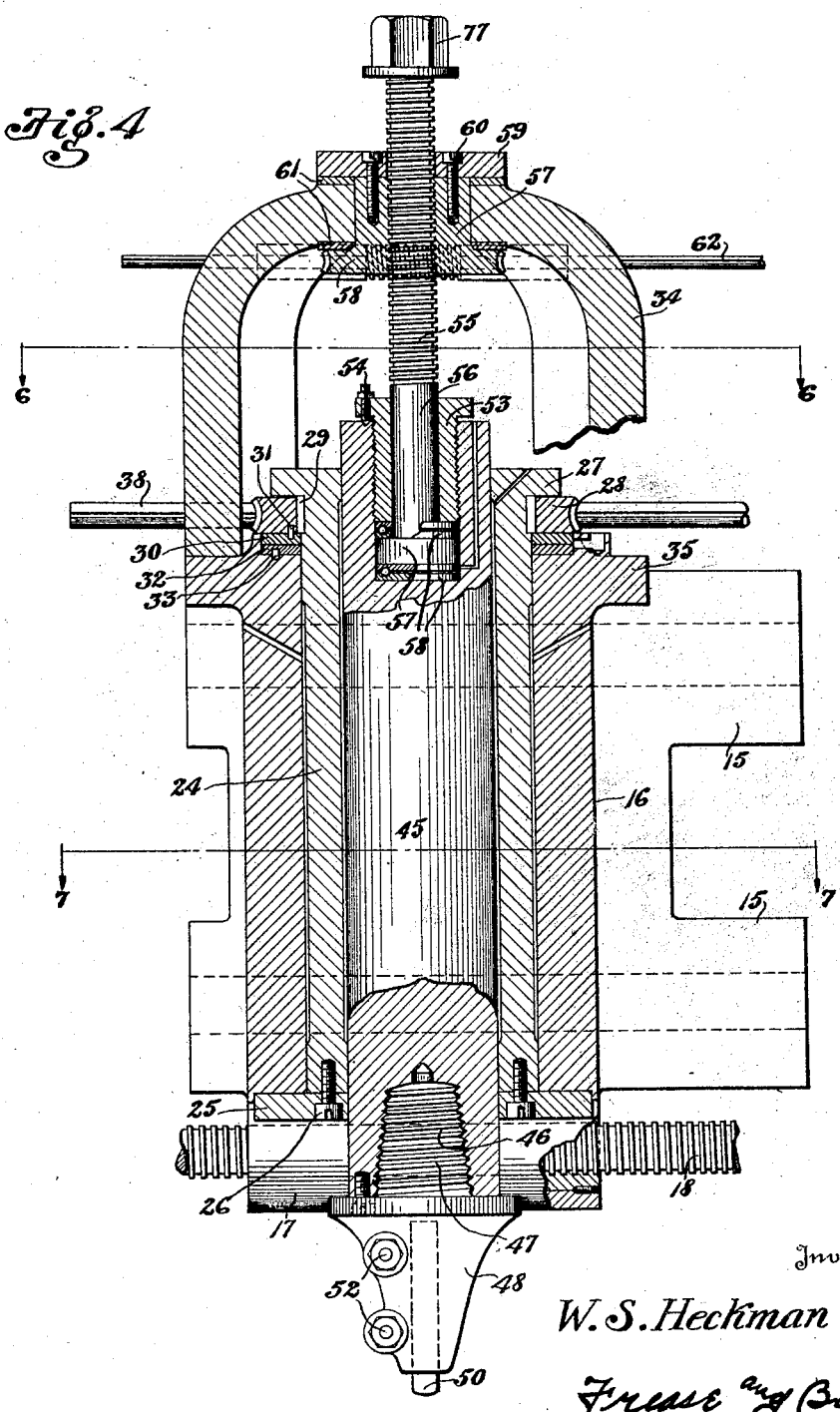
Figure 5:
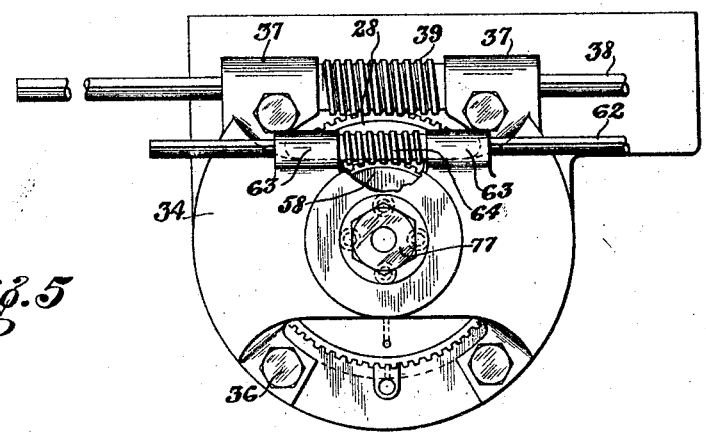
Figure 6:
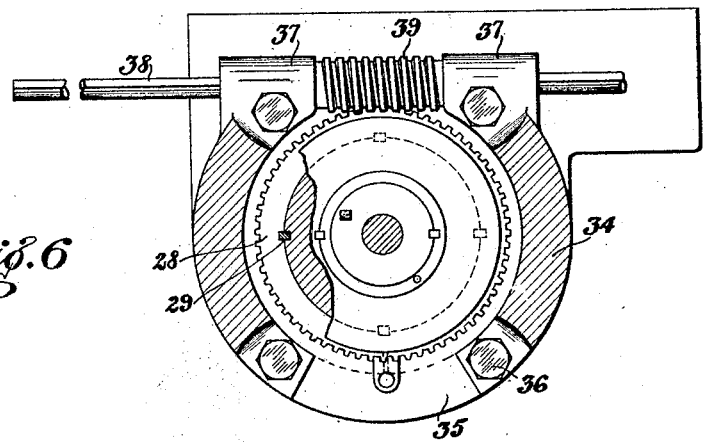

Figure 1 is a side elevation of the improved billet planer;

Fig. 2, an end elevation of the same;

Fig. 3, a side elevation of the tool head;

Fig. 4, a section on the line 4—4, Fig. 3;

Fig. 5, a top plan view of the tool head;

Fig. 6, a section on the line 6—6, Fig. 4; and

Figure 7:
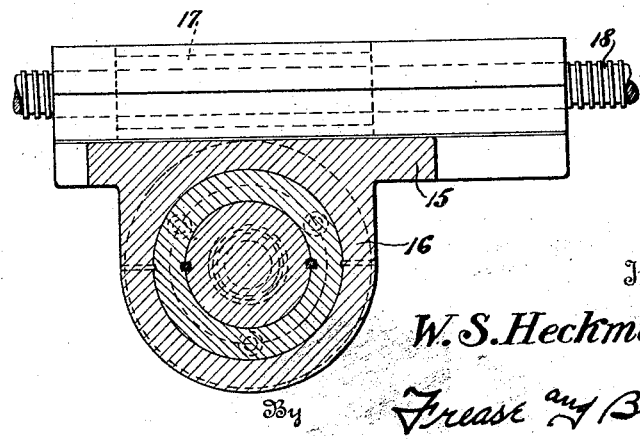

Fig. 7, a section on the line 7—7, Fig. 4.

Similar numerals of reference indicate corresponding parts throughout the drawings.

The machine is supported upon a bed 1, provided with the longitudinal guides 2 in which is mounted, for reciprocating movement, the table 3, arranged to receive the ingot or the like to be planed and provided with the inverted, T-shaped grooves 4 to receive clamps of any suitable description for clamping the ingot upon the table.

A reversing motor 5 is mounted at one side of the base for the purpose of operating the table to and fro upon the bed and is provided with the pinion 6 meshing with the gear 7 upon the countershaft 8. A pinion 9 upon the countershaft meshes with the gear 10 upon a parallel shaft 11, said gear meshing with the rack 12 upon the under side of the table.

A bracket arm 13 extends over the table and is provided with the horizontal, transverse guides 14 upon which is mounted the head bracket 15 carrying the tool head 16. A nut 17 is carried upon the bracket 15 and engages the screw 18 mounted in the thrust bearing 19 upon the bracket arm 13 and provided at its extremity with the gear 20.

A reversing motor 21 is mounted upon a bracket 22 at one side of the arm 13 and the shaft of the motor has fixed thereon a pinion 23 which meshes with the gear 20 upon the screw 18 to move the tool head upon the guides 14 transversely across the face of the ingot.

The vertical spindle sleeve 24 is rotatably mounted within the tool head 16 and provided at its lower end with the flange plate 25 connected thereto as by the screws 26, the upper end of the spindle extending above the upper extremity of the head and being provided with the integral, annular flange 27.

The worm wheel 28 is keyed upon the sleeve beneath said flange, as indicated at 29 and the bearing disk 30 is fixed to the under side of said worm wheel as by the dowel pins 31 and rests upon the bearing disk 32 which is fixed to the upper end of the tool head as by the dowel pins 33.

A bonnet 34 is connected to the upper flanged end 35 of the tool head as by the cap screws 36 and provided with the spaced bearings 37, in which is journaled the longitudinally grooved feed shaft 38.

The worm 39 is splined upon the shaft 38, between the bearings 37 and meshes with the worm wheel 28. The shaft 38 extends through the bearing 40 upon the arm 13 and is provided with a gear 41 meshing with the pinion 42 upon the shaft of the reversing motor 43 which is mounted upon a bracket 44 carried by the arm 13.

The tool spindle 45 is splined within the spindle sleeve 24 and provided with the tapered screw threaded socket 46 at its lower end to receive the threaded stem 47 of the tool clamping head 48 having the inclined rear face 49 to which the tool 50 is clamped as by the tool clamp 51 and clamping bolts 52.

The vertical feed gland 53, is threaded into the upper end of the tool spindle 45 and held against relative movement therewith by means of the check screw 54. The vertical feed screw 55 has the smooth lower end 56 journaled through the gland and provided with the annular flange 57 at its lower extremity upon either side of which are located the vertical thrust bearings 58.

The nut 57 is journaled in the upper end of the bonnet and surrounds the screw 55 having the worm wheel 58 formed integrally upon or fixed to the lower end thereof, the flange plate 59 being attached to the upper end of the nut as by the screws 60, bearing disks 61 being located on opposite sides of the bonnet to engage the flange plate and the worm wheel.

The grooved vertical feed shaft 62 is journaled in bearings 63 provided upon the bonnet and the worm 64 is splined upon said shaft and meshes with the worm wheel 58. A sprocket wheel 65 is fixed upon the shaft 62 and connected by the sprocket chain 66 with a sprocket 67 upon the shaft of the motor 68 which is mounted upon a bracket 69 carried upon the arm 13.

A control box 70 is located adjacent to the machine and provided with the levers 71, 72, 73 and 74, each of which is operatively connected with a reversing and stopping switch of any usual construction, controlling the motors 5, 21, 43 and 68 respectively.

Thus the operator can stand beside the machine in position to watch the operation of the tool upon the ingot and control the longitudinal, transverse, torsional and vertical movements, causing the tool to follow the contour of the "snake" at the operator's will.

If required, a balance weight 75 may be provided, mounted upon the lever 76 pivotally connected at its forward end to the nut 77 upon the vertical feed screw 55 and connected intermediate its extremities, as at 78, to the link 79 which is connected at its lower end to the ear 80 upon the rear side of the bonnet.

In operating the machine, the ingot to be planed is mounted longitudinally upon the table and clamped thereon, and the table reciprocated forward and backward at the will of the operator, while the tool head is moved transversely across the machine, bringing the tool into position to engage the "snake" in the ingot and to cause the tool to follow the "snake" as the ingot is moved lengthwise beneath the same.

The depth of the cut may be adjusted as the machine is operated and the tool spindle rotated entirely around so that the tool can operate upon the ingot while it is moving in each longitudinal direction.

I claim:—

1. A planer including a longitudinally movable table arranged to carry an ingot, a tool head transversely movable over the table, a tool spindle rotatable on its axis in the head and vertically movable therein and independent reversing means controlling the movement of the table and the movement of the head and independent means controlling the rotation of the spindle to follow the "snake" in the ingot.

2. A planer including a longitudinally movable table arranged to carry an ingot, a tool head transversely movable over the table, a tool spindle sleeve rotatable on its axis in the head, a tool spindle vertically movable within the sleeve and independent means for controlling the movement of the table, the movement of the tool head, the rotation of the sleeve and the vertical movement of the spindle.

3. A planer including a longitudinally movable table arranged to carry an ingot, a tool head transversely movable over the table, a tool spindle rotatable on its axis in the head and vertically movable therein, and independent reversing motors controlling the movement of the table, the movement of the head and the rotation of the spindle to follow the "snake" in the ingot.

4. A planer including a longitudinally movable table arranged to carry an ingot, a tool head transversely movable over the table, a tool spindle sleeve rotatable on its axis in the head, a tool spindle vertically movable within the sleeve and independent reversing motors for controlling the movement of the table, the movement of the head, the rotation of the sleeve and the vertical movement of the spindle.

5. A planer including a longitudinally movable table arranged to carry an ingot, a tool head transversely movable over the table, a tool spindle vertically movable within the head and independent reversing motors for controlling the movement of the table, the movement of the head and the vertical movement of the spindle.

6. A planer including a longitudinally movable table arranged to carry an ingot, a tool head transversely movable over the table, a tool spindle rotatable on its axis in the tool head and vertically movable therein, independent reversing motors controlling the movement of the table, the movement of the head and the rotation and vertical movement of the spindle, and independent means for controlling each of the reversing motors.

7. A planer including a longitudinally movable table arranged to carry an ingot, a tool transversely, vertically and rotatably movable over the table and arranged to engage the upper surface of the ingot to plane "snakes" therefrom, an independent reversing motor for moving the table and independent reversing motors for controlling the transverse, vertical and rotatable movements of the tool to follow the contour of the "snake" in the ingot.

WILLIAM S. HECKMAN.